May 13, 1947.  D. B. HAMPTON  2,420,371
TRAP
Filed Nov. 6, 1943

INVENTOR.
DURWARD B. HAMPTON
BY George B. White
ATTORNEY

Patented May 13, 1947

2,420,371

UNITED STATES PATENT OFFICE 2,420,371

TRAP

Durward B. Hampton, Sebastopol, Calif., assignor of forty-eight per cent to Charles G. Holme, Sebastopol, Calif.

Application November 6, 1943, Serial No. 509,330

1 Claim. (Cl. 43—83)

This invention relates to a trap and particularly to a gopher trap.

The primary object of the invention is to provide a trap of the transverse jaw type which can be easily set by turning and lifting one of the jaws to open position, and which is tripped by a treadle responsive to the weight or pressure exerted by the animal to be trapped.

Another object of this invention is to provide a trap which is highly useful and simple in construction. Convenience of arrangement, lightness and comparative inexpense of manufacture are further objects which have been borne in mind in the production and development of the invention.

I am aware that some changes may be made in the general arrangements and combinations of the device and parts, as well as in the details of the construction thereof without departing from the scope of the present invention as set forth in the following specification, and as defined in the following claim; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein Fig. 1 is a side view of the trap.

Figure 1:
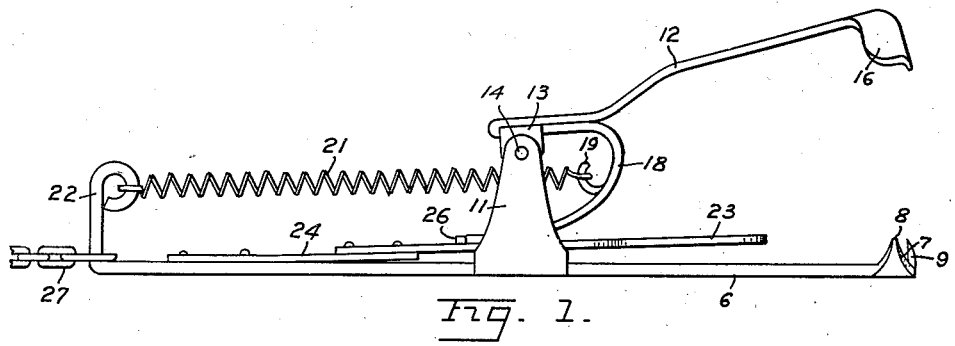
Figure 2:
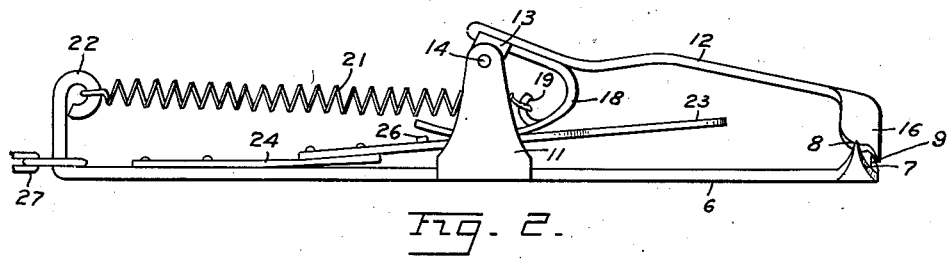
Fig. 2 is a side view showing the trap in closed position.
Figure 3:
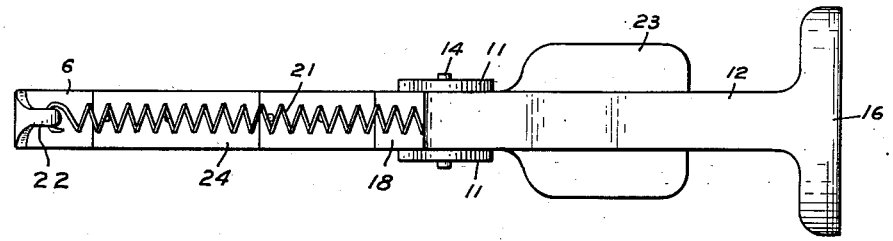
Fig. 3 is a top plan view of the trap in closed position.
Figure 4:
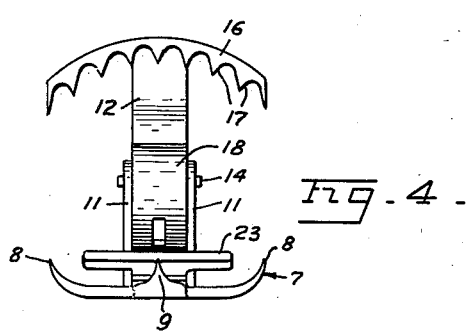
Fig. 4 is an end view of the trap showing the jaws open.

In carrying out my invention I make use of a base 6. A transverse jaw 7 is formed at one end of the base by a cross bar which has upwardly turned ends with sharp points 8. A central tooth 9 extends upwardly from the cross bar and is inclined upwardly and toward the base 6.

At about intermediate between the ends of the base 6 are a pair of upwardly extending bearing brackets 11. A lever 12 has ears 13 pivoted on a pivot 14 near the top of the brackets 11. The lever extends toward the jaw end of the base 6. A transverse jaw 16 is formed on the end of the lever 12. This transverse jaw 16 is curved transversely of the base so that its concave side is opposite to the jaw 7 on the end of the base. On the transverse jaw 16 are provided a plurality of sharp teeth 17. It is to be noted that the teeth 17 all point in the same direction, parallel with one another and substantially at right angles to the base 6.

A curved arm 18 extends from the lever 12 downwardly between the brackets 11 in a direction away from the jaws. It is to be noted that the lever and its arm or extension are made of one piece of material bent upon itself to form the particular shaped parts of the lever and arm. On the inside of the curved arm 18 of the lever 12 is a hook 19 into which is hooked an end of a coil spring 21. The other end of the coil spring is held in an eye or hook member 22 on the free end of base 6. The pull exterted by the coil spring 21 on the curved arm 18 exerts leverage around the pivot 14 as a fulcrum and pulls the lever 12 downwardly so as to close the transverse jaw 16 upon the cross bar jaw 7.

In order to set the trap and to trip it I provide a treadle 23. The treadle is secured at one end to a leaf spring 24 which latter in turn is secured to the base 6. The free end of the treadle 23 extends to a position between the brackets 11 and the jaw 7 and it is urged upwardly toward the curved arm 18 by said leaf spring 24. A stop 26 extends from the top of the treadle 23 opposite the curved end of the arm 18 so that when the lever 12 is in open position, the end of the curved arm 18 abuts against the stop 26 and is thus prevented from snapping to closed position under the force of the coil spring 21.

In operation and use this trap is set very simply by pulling up the jaw lever 12 until the free end of the curved arm 18 passes by the stop 26 on the stem of the treadle 23, and is then released to abut against the stop 26. The base, the treadle as well as the jaws are of such width that they can be easily inserted into a place of limited width, such as into a gopher hole. When the gopher passes between the jaws and reaches over the wider portion of the treadle 23 the leverage of its weight pushes the treadle 23 down toward the base 6 thereby moving the stop 26 out of the way of the curved arm 18, whereupon the coil spring 21 through the arm 18, snaps the lever 12 and the transverse jaw 16 upon jaw 7 and upon the body of the gopher therebetween.

A suitable chain 27 may be provided at the eye 22 of the base 6 for facilitating the removal of the trap from the gopher hole.

I claim:

A trap of the character described comprising, a base, a transverse jaw at an end of the base, a hook member at the other end of the base, brackets extended above the base between said ends, a lever pivoted in said brackets around an axis transverse to said base, a jaw on the lever opposite said first jaw, an extension extended from said lever and curved downwardly and toward said hook member, a spring connected to said hook member and to said extension to urge the lever toward the base and toward said first jaw, a treadle extended longitudinally on the base and past said brackets, a spring end on the treadle extended toward said hook member and secured to the base so as to urge the treadle away from said base, a projection on said treadle engaging said lever extension to prevent the turning of the lever toward the first jaw, said projection being cleared from said extension when said treadle is depressed to trip said trap and close said jaws.

DURWARD B. HAMPTON.

REFERENCES CITED

The following references are of record in the file of this patent:

UNITED STATES PATENTS

| Number | Name | Date |
|---|---|---|
| 1,083,125 | Nebel | Dec. 30, 1913 |
| 1,588,083 | Worsley | June 8, 1926 |
| 1,130,992 | Mansfield | Mar. 9, 1915 |
| 1,241,058 | Twitchell | Sept. 25, 1917 |
| 119,237 | Mooney et al. | Sept. 26, 1871 |
| 1,264,703 | Sothan | Apr. 30, 1918 |
| 1,199,901 | Keeffner | Oct. 3, 1916 |
| 1,500,332 | Preston | July 8, 1924 |

FOREIGN PATENTS

| Number | Country | Date |
|---|---|---|
| 800,395 | France | May 4, 1936 |
| 766,203 | France | Apr. 9, 1915 |